May 13, 1952     P. METZGER     2,596,269
TROLLING DEVICE
Filed Aug. 14, 1946
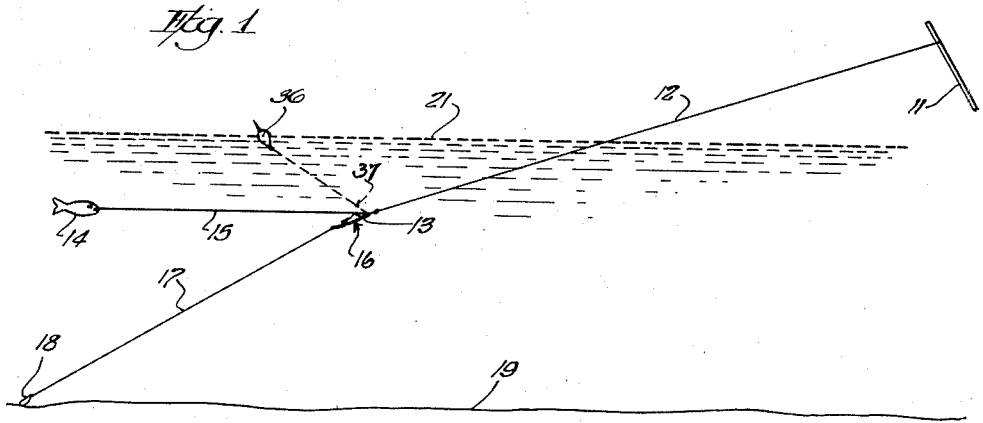
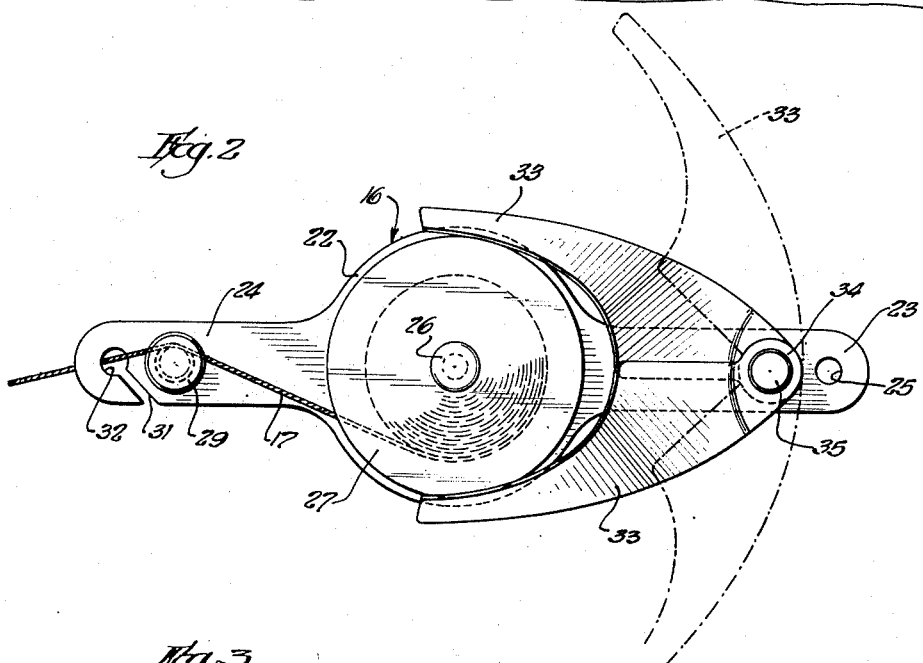
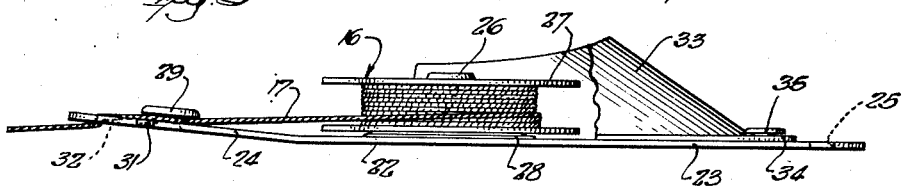
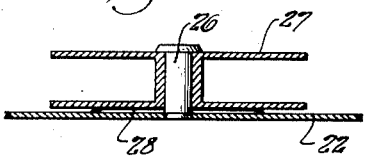
INVENTOR.
Paul Metzger
BY
Sheridan, Ross & Cargill
Attys.

Patented May 13, 1952

2,596,269

UNITED STATES PATENT OFFICE 2,596,269

TROLLING DEVICE

Paul Metzger, Chicago, Ill.

Application August 14, 1946, Serial No. 690,424

4 Claims. (Cl. 43—43.11)

1

This invention relates in general to fishing tackle, and more particularly to a device especially useful in trolling.

A principal object of the invention is the provision of a device adapted to be attached to a fishing line, in spaced relationship to the bait also secured thereto, and including readily adjustable means for maintaining the bait at any desired depth in the water.

Another important object of the invention is to provide novel means for preventing loss of the bait, hook or lure by snagging on the bottom or on foreign objects thereon.

A further object of the invention is the provision in such a device of means to prevent snagging of the device itself in weeds or the like through which it may be drawn.

More specifically, an object of the instant invention is the provision of a light weight, inexpensive trolling device readily attachable to a fishing line in spaced relationship to the bait or lure secured to the line and including an adjustable reel or spool carrying a sufficient length of line or thread of lesser test strength than the fishing line to maintain the bait at any desired depth in the water by means of a common lead weight or sinker attached to one end thereof and adapted to rest on the bottom, whereby the bait is insured against snagging on the bottom and is retained at any desired variable distance therefrom and, if the sinker should become seriously entangled, the adjustable thread or line to which it is attached will break with a resulting loss of the sinker only.

Another object of the instant invention is the provision in such a device of means for preventing more than the desired variable, predetermined length of light weight line carried by the spool from being unwound therefrom while fishing.

A further object of the invention is the provision of novel means for preventing the snagging of the spool of such a device in weeds or the like through which it may be drawn, which means is readily manually movable out of its normal cooperative relationship with the spool to facilitate operation of the latter in adjusting the sinker carrying portion of the line thereon to the desired length.

Numerous other objects and advantages of the invention will be apparent as it is better understood from the following description, which, when taken in connection with the accompanying drawings, discloses a preferred embodiment thereof.

2

In the drawings,

Figure 1 is an elevational view of fishing tackle including the device of the instant invention as it would appear in action, maintaining the bait at a desired depth in the water while being trolled;

Fig. 2 is an enlarged top plan view of the trolling device;

Fig. 3 is a side elevation of the device of Fig. 2, with part of one of the anti-weed guard wings broken away; and Fig. 4 is a detail vertical section through the spool of the device of Figs. 2 and 3.

It is recognized that in any given body of water, at any given time, fish therein which it is desired to catch will be found in a particular horizontal strata, that is at a particular depth or distance from the top or bottom of the water, which depends upon the time of day, weather conditions, etc., at that certain time. It is also generally conceded that the temperature of the water is the primary factor in determining such critical depth. Consequently, in still fishing, particularly deep water fishing, and in trolling, satisfactory results may be obtained only when the bait or lure is maintained at, or relatively close to, such critical depth. This critical depth may be determined, according to some schools of thought, by taking temperature readings at different arbitrarily selected levels. Or it may be determined by other methods, as merely by placing the bait at different depths until one is hit upon at which satisfactory results are obtained. At any rate, it is extremely desirable to be able to maintain the bait or lure at a predetermined level or depth, especially in trolling, and also to be able readily to change or vary such vertical positioning of the bait.

It is with these latter problems that the present invention is concerned and to which it offers a completely satisfactory solution by providing a simple device attachable to a fishing line for maintaining the bait or lure employed at a predetermined and readily variable level.

Referring more particularly to Fig. 1 of the drawings, such use of the instant invention is illustrated therein by the representation of a fishing pole 11 having a line 12 of any desired characteristics attached at one end thereto in well-known manner, and secured at its other end to one loop of a common three-loop swivel 13. The bait or lure 14 being employed is secured by means of the usual leader 15 to another loop of the swivel 13, and a trolling device embodying the features of the invention and designated generally by reference numeral 16 is attached at its forward end to the remaining one of the three loops of the swivel 13. The trolling device 16, as will be more fully described hereinafter, incorporates an additional line or thread 17 of readily variable length, and very much lighter in weight or of materially lesser strength than the main fishing line 12, to the free end of which is secured a lead weight or other type of common sinker 18.

In trolling with this arrangement, as shown in Fig. 1, the sinker 18 is adapted to be dragged along the bottom 19 of the body of water being fished, the upper surface of which is designated by reference numeral 21. Since the angle of entry of the main line 12 into the water may readily be maintained constant by retaining the pole 11 in any one particular position, and the length of the leader 15 remains the same, the bait 14 will be maintained at any desired depth or level by selection of the proper length for the auxiliary or lighter test line 17. As will be described in detail later, means are provided on the trolling device 16 for readily adjusting the length of this auxiliary line 17, so that the bait 14 will be maintained at the critical depth, which may be determined in any desired manner as hereinbefore described. And, if the first setting of the length of the auxiliary line 17 should prove to be incorrect or unsatisfactory results are obtained therewith, such setting may be varied or changed very quickly.

Referring now to Figs. 2 to 4 of the drawings, the embodiment of the trolling device 16 therein disclosed will be described in detail. The device comprises a main body portion or base plate 22, preferably stamped from any suitable light gauge metal, having a central, substantially circular portion terminating in forwardly and rearwardly extending arms 23 and 24, respectively, which are formed integrally therewith. The forward arm 23 is provided with an aperture 25 therethrough to facilitate attachment of the device to the swivel 13, and, as will be seen from Fig. 3, the rear arm 24 is displaced or slopes upwardly from the horizontal plane of the central portion and arm 23 of the base plate 22 for a purpose which will later be more readily apparent.

Secured at its lower end to the base plate 22 and extending through a suitable aperture located centrally therein, is an upstanding rivet 26 (Fig. 4) which functions as a pivot post or stub shaft for the hollow hub of a spool or reel 27 and retains the latter on the base plate. The spool 27 may be made of any desired light weight metal, but is preferably formed from a suitable plastic material, and constitutes a storing means for carrying the auxiliary line 17. Interposed between the base plate 22 and the lower side of the spool 27 is a tensioning or spring device 28 of any desired construction, for frictionally resisting rotational movement of the spool and retaining the same in any set position, which is herein illustrated as comprising a dished metal washer surrounding the rivet 26. The relatively light test line or thread 17 is wound upon the reel or spool 27, as best seen in Fig. 3, with the inner end thereof preferably secured to the spool in any suitable manner. With this arrangement, any desired length of the line 17, to the free end of which the sinker 18 is attached, may be unwound from the spool 27, the spring member 28 permitting rotation of the spool by finger engagement with its peripheral edges or by pulling on the free end of the line 17.

Means are provided for readily securing this unwound portion of the auxiliary line 17 to the base plate 22 adjacent to, but independently of, the spool 27, which comprises a rivet 29 upstanding from and attached at its lower end to the rear arm 24 of the base plate and a guide slot 31 connecting with a line-retaining aperture 32 (Fig. 2) in the arm 24 rearwardly of the rivet 29. As shown in Figs. 2 and 3, to secure the forward end of the trailing or unwound portion of the line 17 to the base plate 22, it is only necessary to snub the same around the shank and under the head of the stud or rivet 29 and then to slip it through the slot 31 and into the aperture 32. The reason for the upward sloping of the rear arm 24 will thus be apparent, since it places the shank of the rivet 29 in alignment with the lower portion of the spool 27 to facilitate snubbing of the line 17 thereon.

If, during use of the trolling device 16, it is desired to vary or change the effective length of the auxiliary line 17, such may readily and rapidly be accomplished merely by sliding the line from the retaining aperture 32, through the slot 31, unwinding it from the rivet 29 and removing more line from, or winding some onto, the spool 27 and re-snubbing the resulting new length of line on the rivet 29. As previously noted, the auxiliary line 17 is of materially lesser strength than the main fishing line 12. For example, if a twelve pound test line is being used for the main line 12, it is preferred to use a two pound test line for the auxiliary line 17, although this particular ratio is not essential. This difference in strength between the lines 12 and 17 is employed for the purpose of preventing loss of the bait or lure 14, and also of the trolling device 16, if the sinker 18 becomes seriously snagged or entangled while being dragged along the bottom 19 during trolling. In such a case, the auxiliary line 17 will break, resulting in the loss only of the common sinker 18.

Means are also provided for preventing snagging of the trolling device 16 in any weeds or the like through which it may be pulled which comprise a pair of anti-weed guards 33 (Figs. 2 and 3). Each guard 33 is in the shape of a wing, with its rear end normally loosely embracing or surrounding one side of the forward portion of the spool 27, and with its forward portion sloping downwardly, as shown in Fig. 3, and terminating in a flat or horizontal front end 34. These front ends 34 are pivotally connected to the forward arm 23 of the base plate 22 by a suitable rivet 35. In their normal position, as illustrated in full lines in Fig. 2, the inner edge and the front end 34 of one of the guards 33 overlaps the same parts of the other guard member. Consequently, these guards provide a means for readily parting any weeds through which the trolling device 16 is drawn and for preventing such weeds from becoming entangled with the trolling device and particularly the spool or reel 27. At the same time, the guards 33 may be flipped or swung outwardly to their inoperative position, as shown in broken lines in Fig. 2, whenever it is desired to manipulate the reel or spool 27 with the fingers.

Auxiliary means may be provided, if desired, to prevent sinking of the trolling device 16 to the bottom 19 of the body of water being fished if the sinker 18 has been snagged and the auxiliary line 17 has been broken. Under such circumstances, there may be a natural reaction on the part of the person doing the trolling to quickly release the greater than normal tension temporarily applied to the line 12 when the sinker 18 is snagged and the auxiliary line 17 consequently is broken, as by sharply and involuntarily moving the pole 11 in a direction opposite to that in which it was moving while trolling, that is, to the left in Fig. 1. Such release of normal trolling tension on the line 12 would permit the trolling device 16 to sink to the bottom 19 where it also might become snagged. To avoid this possibility, a float 36 may be attached by means of a suitable line 37 to the swivel 13 so that, while normally assuming the position illustrated in Fig. 1 during trolling, it would prevent sinking of the device 16 to the bottom upon release of normal trolling tension on the line 12. It will be understood, of course, that if the device 16 is constructed throughout of plastic material, it will have sufficient buoyancy to effect the above-recited desired result without the use of the float 36. If the parts 22, 26, 29, 33 and 35 of the trolling device are constructed of metal, however, such will not be the case. The buoyancy desired for the above result may be obtained in the latter construction, in lieu of using the float 36, by attaching a strip of cork or other buoyant material to the underside of the base plate 22 with a suitable adhesive, or a suitable float member may be mounted directly on or secured to the forward arm 23 of the base plate 22.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A trolling device, comprising a base member attachable to a fishing line, an auxiliary line having a weight attached to one end thereof, means for mounting said auxiliary line on said base member and for adjustably securing the same thereto at a point spaced any desired distance from said weight, and means mounted on said base member and substantially embracing said mounting means for guarding against snagging of said mounting means by any weeds through which said device is drawn.

2. A trolling device, comprising a base member attachable to a fishing line, an auxiliary line having a weight attached to one end thereof, a spool rotatably mounted on said base member for carrying said auxiliary line, means mounted on said base member for adjustably securing said auxiliary line thereto at a point on said line spaced any desired distance from said weight, and means mounted on said base member for preventing snagging of said spool by any weeds through which said device is drawn.

3. A trolling device, comprising a base member attachable to a main fishing line, an auxiliary line of lesser strength than said main line and having a weight attached to one end thereof, a spool rotatably mounted on said base member for carrying said auxiliary line, means mounted on said base member for adjustably securing said auxiliary line thereto at a point spaced any desired distance from said weight, and guard means mounted on said base member for preventing snagging of said spool by any weeds through which said device is drawn, comprising a pair of wing-shaped members pivotally mounted at the forward end of said base member and normally embracing opposite sides of said spool and swingable away from the latter to facilitate manual rotation of the spool.

4. A trolling device, comprising a base member attachable to a fishing line to be drawn through the water thereby, an auxiliary line having a sinker attached to one end, a spool rotatably mounted on and upstanding from said base member for carrying wound thereon all or a desired portion of said auxiliary line, said auxiliary line having its other end secured to said spool, friction means interposed between said base member and said spool for frictionally resisting rotation of the latter and for retaining the same in desired adjusted position, and means for fastening and adjustably securing to said base member that portion of said auxiliary line not wound on said spool at any desired point intermediate the ends of the auxiliary line, comprising a stud secured to and upstanding from said base member and terminating in an enlarged head spaced from said base member, whereby said auxiliary line may be snubbed around said stud at any desired point intermediate the ends of said line, and said base member having a line-retaining aperture extending therethrough adjacent and in the direction of the axis of said stud through which the unwound portion of said auxiliary line may be passed to maintain said auxiliary line in snubbed engagement with said stud.

PAUL METZGER.

REFERENCES CITED

The following references are of record in the file of this patent:

UNITED STATES PATENTS

| Number | Name | Date |
|---|---|---|
| 384,853 | Keller | June 19, 1888 |
| 575,205 | Breitstein | Jan. 12, 1897 |
| 585,564 | Freeman | June 29, 1897 |
| 676,962 | Payton | June 25, 1901 |
| 1,383,474 | Lucas | July 5, 1921 |
| 1,665,144 | Murray | Apr. 3, 1928 |
| 1,915,208 | Walthers | Jan. 20, 1933 |
| 1,918,507 | Westling | July 18, 1933 |
| 1,993,974 | McVicker | Mar. 12, 1935 |
| 2,190,113 | Chreitzberg | Feb. 13, 1940 |
| 2,190,984 | Gulbrandsen | Feb. 20, 1940 |
| 2,308,238 | Baker | Jan. 12, 1943 |